US012584438B2

(12) United States Patent
Okamoto et al.

(10) Patent No.: US 12,584,438 B2
(45) Date of Patent: Mar. 24, 2026

(54) DIESEL ENGINE

(71) Applicant: YANMAR HOLDINGS CO., LTD., Osaka (JP)

(72) Inventors: Yuki Okamoto, Osaka (JP); Masataka Uchibori, Osaka (JP)

(73) Assignee: YANMAR HOLDINGS CO., LTD., Osaka (JP)

( * ) Notice: Subject to any disclaimer, the term of this patent is extended or adjusted under 35 U.S.C. 154(b) by 0 days.

(21) Appl. No.: 18/810,476

(22) Filed: Aug. 20, 2024

(65) Prior Publication Data

US 2024/0410309 A1 Dec. 12, 2024

Related U.S. Application Data

(63) Continuation of application No. 18/041,875, filed as application No. PCT/JP2021/031119 on Aug. 25, 2021, now Pat. No. 12,098,670.

(30) Foreign Application Priority Data

Sep. 30, 2020 (JP) ................................ 2020-165318

(51) Int. Cl.
*F02B 29/04* (2006.01)
*F01N 13/18* (2010.01)
(Continued)

(52) U.S. Cl.
CPC ...... *F02B 29/0431* (2013.01); *F01N 13/1805* (2013.01); *F01N 13/185* (2013.01); (Continued)

(58) Field of Classification Search
CPC .. F02B 29/0431; F02B 29/0475; F02B 37/00; F01N 3/106; F01N 3/2066
See application file for complete search history.

(56) References Cited

U.S. PATENT DOCUMENTS

2016/0010308 A1* 1/2016 Shimohira .......... F01N 13/1805 180/309
2017/0218822 A1* 8/2017 Yamashita ............... F01M 9/10
2023/0313732 A1 10/2023 Okamoto et al.

FOREIGN PATENT DOCUMENTS

CN 215109156 U 12/2021
CN 108999688 B 4/2024 .............. F01P 11/10
(Continued)

OTHER PUBLICATIONS

International Search Report for PCT Patent App. No. PCT/JP2021/031119 (Nov. 9, 2021).

(Continued)

*Primary Examiner* — Shafiq Mian
(74) *Attorney, Agent, or Firm* — Future IP LLC; Tomoko Nakajima

(57) ABSTRACT

This diesel engine includes a turbocharger which compresses intake air by utilizing a flow of exhaust gas, and an exhaust gas after-treatment device which purifies the exhaust gas, wherein an exhaust pipe connects the exhaust gas after treatment device and the turbocharger, and is connected upwardly to the exhaust gas after-treatment device. The exhaust pipe can have a curbed portion, and have one end and another end, and both ends can face towards a front direction of the diesel engine. The exhaust pipe can be extended to a rear side in the engine front-rear direction, then bent by 180 degrees, and after being extended to a front side in the engine front-rear direction below the turbocharger, can be bent upward and is connected to the exhaust gas after-treatment device. The turbocharger can have an intake ejection pipe which ejects the gas and faces towards the front direction.

10 Claims, 7 Drawing Sheets

(51) Int. Cl.

| | |
|---|---|
| ***F02B 37/00*** | (2006.01) |
| *F01N 3/10* | (2006.01) |
| *F01N 3/20* | (2006.01) |

(52) U.S. Cl.

CPC .......... *F02B 29/0475* (2013.01); *F02B 37/00* (2013.01); *F01N 3/106* (2013.01); *F01N 3/2066* (2013.01)

(56) References Cited

FOREIGN PATENT DOCUMENTS

| | | | |
|---|---|---|---|
| EP | 3225749 | A1 | 10/2017 |
| JP | 2015014292 | A | 1/2015 |
| JP | 7143622 | B2 | 9/2022 |
| TW | 2014168079 | A1 | 10/2014 |
| WO | 2014168079 | A1 | 10/2014 |
| WO | 2016059963 | A1 | 4/2016 |

OTHER PUBLICATIONS

JAPANESE Notice of Reasons for Refusal for Application No. 2020-165318 (dated Dec. 12, 2023) with English language translation thereof.

English Translation CN-108999688-B (Year: 2024).

English Translation JP-7143622-B2 (Year: 2022).

English Translation CN-215109156-U (Year: 2021).

* cited by examiner

DIESEL ENGINE

This application is a Continuation under 35 U.S.C. § 120 of U.S. patent application Ser. No. 18/041,875, filed Feb. 16, 2023, which was a national phase entry under 35 U.S.C. § 371 of PCT Patent Application No. PCT/JP2021/031119, filed on Aug. 25, 2021, which claims priority under 35 U.S.C. § 119 to Japanese Patent Application No. 2020-165318, filed Sep. 30, 2020, the entireties of which are incorporated by reference.

TECHNICAL FIELD

The present invention relates to diesel engines, and more particularly, to diesel engines provided with a turbocharger and an exhaust gas after-treatment device.

BACKGROUND ART

Conventionally, in diesel engines, increasing an engine output by applying exhaust energy to supercharging by using a turbocharger in which a turbine, which is rotated by exhaust gas discharged from a combustion chamber, is used to rotationally drive a compressor provided in an intake passage, thereby pressurizing fresh air has been performed widely.

In addition, in diesel engines, as an exhaust gas after-treatment device, providing a Diesel Particulate Filter (DPF), which collects particulate matter in exhaust gas, and a Selective Catalytic Reduction (SCR), which causes NOx in the exhaust gas to be reduced by reduction reaction, in an exhaust passage, thereby performing purifying treatment for the exhaust gas discharged from an engine has been performed widely.

For example, Patent Literature 1 discloses a layout in which in a diesel engine configured to have one side of a cylinder head in an engine width direction as the exhaust side and the other side as the intake side, a turbocharger is arranged on the exhaust side; the turbocharger and the intake side are connected to each other via a supercharging pipe extending in the engine width direction above the cylinder head; and a DPF is arranged to extend in the engine width direction at an end portion on one side in an engine front-rear direction.

CITATION LIST

Patent Literature

Patent Literature 1: JP 2015-014292 A

DISCLOSURE OF INVENTION

Problems to be Solved by the Invention

In diesel engines, in addition to increasing of an engine output using a turbocharger and execution of exhaust gas purifying treatment as described above, mountability on a work vehicle is also required. For this reason, an engine as a whole including a turbocharger and an exhaust gas after-treatment device must be made compact.

Incidentally, in engines such as a diesel engine, for instance, the length in an engine front-rear direction, which is a direction parallel to a crank shaft, is generally greater than the length in an engine width direction orthogonal to the engine front-rear direction and an up-down direction. Further, exhaust gas after-treatment devices such as a DPF and an SCR tend to be relatively (as compared to the engine width direction) long.

Despite the above, if an exhaust gas after-treatment device is arranged to extend in the engine width direction as in Patent Literature 1, an engine overall width is determined by the length of the exhaust gas after-treatment device. Thus, there arises a problem in which it is difficult to make the engine as a whole compact.

Hence, the exhaust gas after-treatment device that is relatively long may be arranged to extend in the engine front-rear direction. However, if the exhaust gas after-treatment device and a cylinder head, etc., are arranged side by side in the engine width direction, for example, there arises a problem in which the engine overall width is increased. Furthermore, if the exhaust gas after-treatment device is arranged above the cylinder head, for example, while it is possible to prevent the engine overall width from increasing, a supercharging pipe extending in the engine width direction above the cylinder head and the exhaust gas after-treatment device may interfere with each other.

The present invention has been conceived in consideration of the above points, and an object of the present invention is to provide, in a diesel engine provided with a turbocharger and an exhaust gas after-treatment device, a technique to make the engine as a whole compact.

Means for Solving the Problems

Hence, in order to achieve the above object, in a diesel engine according to the present invention, an exhaust gas after-treatment device is arranged above a cylinder head, and compressed air from a turbocharger is ejected in an engine front-rear direction.

Specifically, the present invention is aimed at a diesel engine provided with: an engine body part in which a cylinder head is fastened to an upper part of a cylinder block; a turbocharger which compresses intake air by utilizing a flow of exhaust gas; and an exhaust gas after-treatment device which purifies the exhaust gas.

Further, the diesel engine is characterized in that: a cooling fan is provided on one side in an engine front-rear direction, which is a direction parallel to a crank shaft, of the engine body part; the cylinder head is formed such that one side in an engine width direction orthogonal to the engine front-rear direction and an up-down direction corresponds to an exhaust side, and the other side corresponds to an intake side; the exhaust gas after-treatment device is arranged to extend in the engine front-rear direction above the cylinder head; and the turbocharger is arranged on the exhaust side of the cylinder head, and is formed to eject compressed air in the engine front-rear direction.

According to this configuration, the exhaust gas after-treatment device that is relatively long is arranged above the cylinder head so as to extend in the engine front-rear direction, in other words, the exhaust gas after-treatment device is arranged to, as seen in plan view, overlap the cylinder head that is relatively long in the engine front-rear direction. Consequently, as compared to cases where the exhaust gas after-treatment device is arranged to extend in the engine width direction or the exhaust gas after-treatment device and the cylinder head are arranged side by side in the engine width direction, an engine as a whole can be made more compact.

Furthermore, unlike a turbocharger in which compressed air is ejected (a supercharging pipe is extended) to traverse a cylinder head in the engine width direction, the turbocharger which is arranged on the exhaust side of the cylinder head is configured to eject compressed air in the engine front-rear direction. Consequently, it is possible to prevent the exhaust gas after-treatment device and the turbocharger from interfering with each other.

Further, in the diesel engine described above, an intercooler which cools compressed air from the turbocharger may be provided on the one side in the engine front-rear direction of the engine body part; and the turbocharger may be arranged close to the cooling fan in the engine front-rear direction on the exhaust side of the cylinder head, and may be formed to eject the compressed air toward a cooling fan side in the engine front-rear direction.

According to this configuration, the intercooler is provided on the one side (the cooling fan side) of the engine body part, and also, the turbocharger is arranged close to the cooling fan in the engine front-rear direction, and compressed air is ejected toward the cooling fan side (the intercooler side) in the engine front-rear direction. Thus, it is possible to efficiently cool the compressed air via a relatively short intake path.

Further, in the diesel engine, an exhaust outlet of the turbocharger and an exhaust introduction port of the exhaust gas after-treatment device may be connected by an exhaust pipe provided on the exhaust side of the cylinder head; and the exhaust outlet of the turbocharger may be located at a central portion in the engine front-rear direction.

According to this configuration, the exhaust outlet of the turbocharger is located at the central portion in the engine front-rear direction. Thus, regardless of whether the exhaust introduction port is provided on the one side (the cooling fan side) in the engine front-rear direction in the exhaust gas after-treatment device that is arranged to extend in the engine front-rear direction, or whether the exhaust introduction port is provided on the other side (the side opposite to the cooling fan) in the engine front-rear direction, it is possible to prevent the exhaust pipe connecting the exhaust outlet and the exhaust introduction port from being extremely long. By virtue of this feature, handling of the exhaust pipe can be easily performed without changing the layout of the turbocharger, in other words, by keeping the turbocharger arranged close to the cooling fan.

Further, in the diesel engine, a flywheel housing, which accommodates a flywheel coupled to the crank shaft, may be provided on the other side in the engine front-rear direction of the engine body part; and the exhaust introduction port of the exhaust gas after-treatment device may be provided above the flywheel housing.

The crank shaft to which the flywheel is attached is usually arranged at a relatively low position in the engine body part. Therefore, according to this configuration, since the exhaust introduction port of the exhaust gas after-treatment device is provided above the flywheel housing which accommodates the aforementioned flywheel, a space above the flywheel housing can be effectively utilized to further make the engine as a whole including the flywheel housing more compact.

Further, in the diesel engine, the exhaust introduction port of the exhaust gas after-treatment device may be provided between the cooling fan and the turbocharger in the engine front-rear direction.

According to this configuration, not only can the degree of freedom of a layout be increased, but it is also possible to place the exhaust gas after-treatment device in proximity to the cooling fan by providing the exhaust introduction port of the exhaust gas after-treatment device between the cooling fan and the turbocharger that is arranged close to the cooling fan. Consequently, it is possible to further make the engine as a whole more compact in the engine front-rear direction.

Effect of the Invention

As described above, according to the diesel engine of the present invention, an engine as a whole can be made compact even if the diesel engine is provided with a turbocharger and an exhaust gas after-treatment device.

DESCRIPTION OF EMBODIMENTS

Embodiments for carrying out the present invention will be described below with reference to the accompanying drawings. In the following description, a direction parallel to a crankshaft will be referred to as an engine front-rear direction, and a direction orthogonal to the engine front-rear direction and an up-down direction will be referred to as an engine width direction. Also, in each of the drawings, an arrow "Fw" indicates the front side in the engine front-rear direction, an arrow "Lf" indicates the left side in the engine width direction, and an arrow "Up" indicates the upper side in the up-down direction.

Embodiment 1

Engine Overall Configuration

Figure 1:
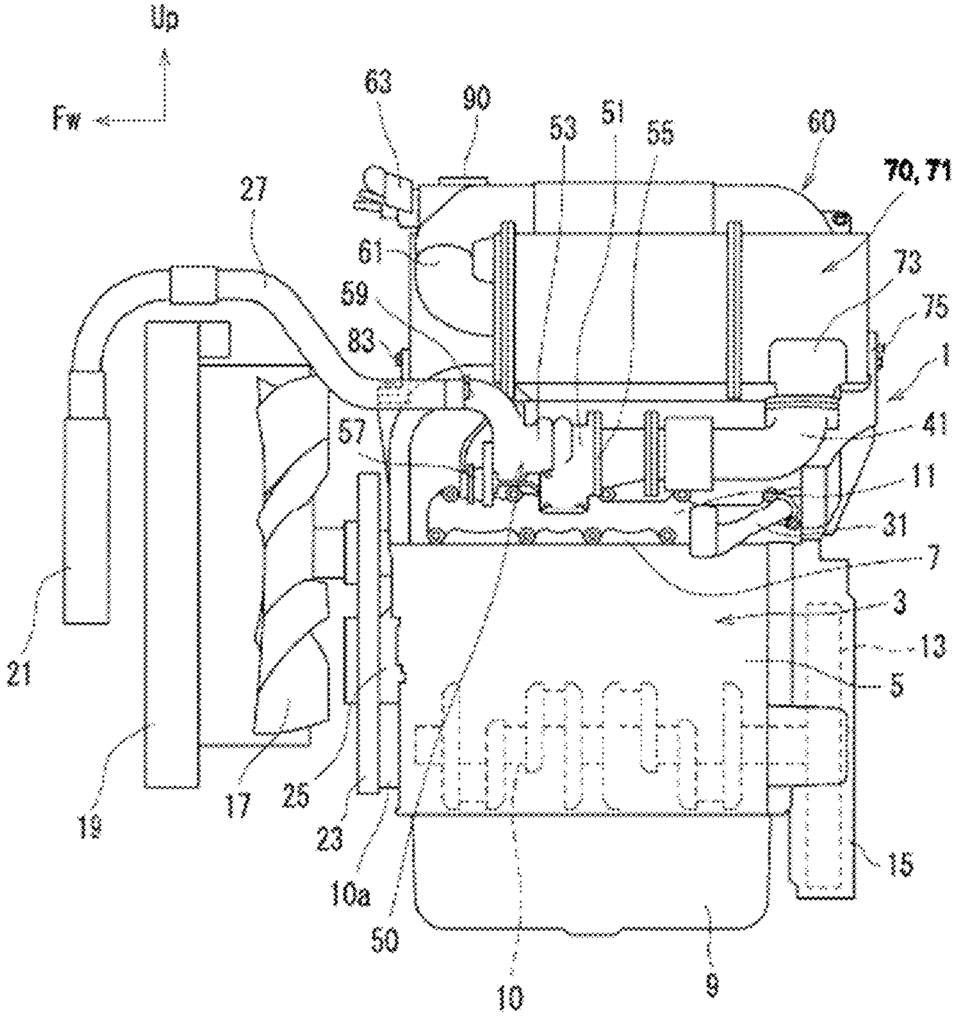
FIG. 1 is a side view which schematically illustrates a diesel engine according to Embodiment 1 of the present invention.
Figure 2:
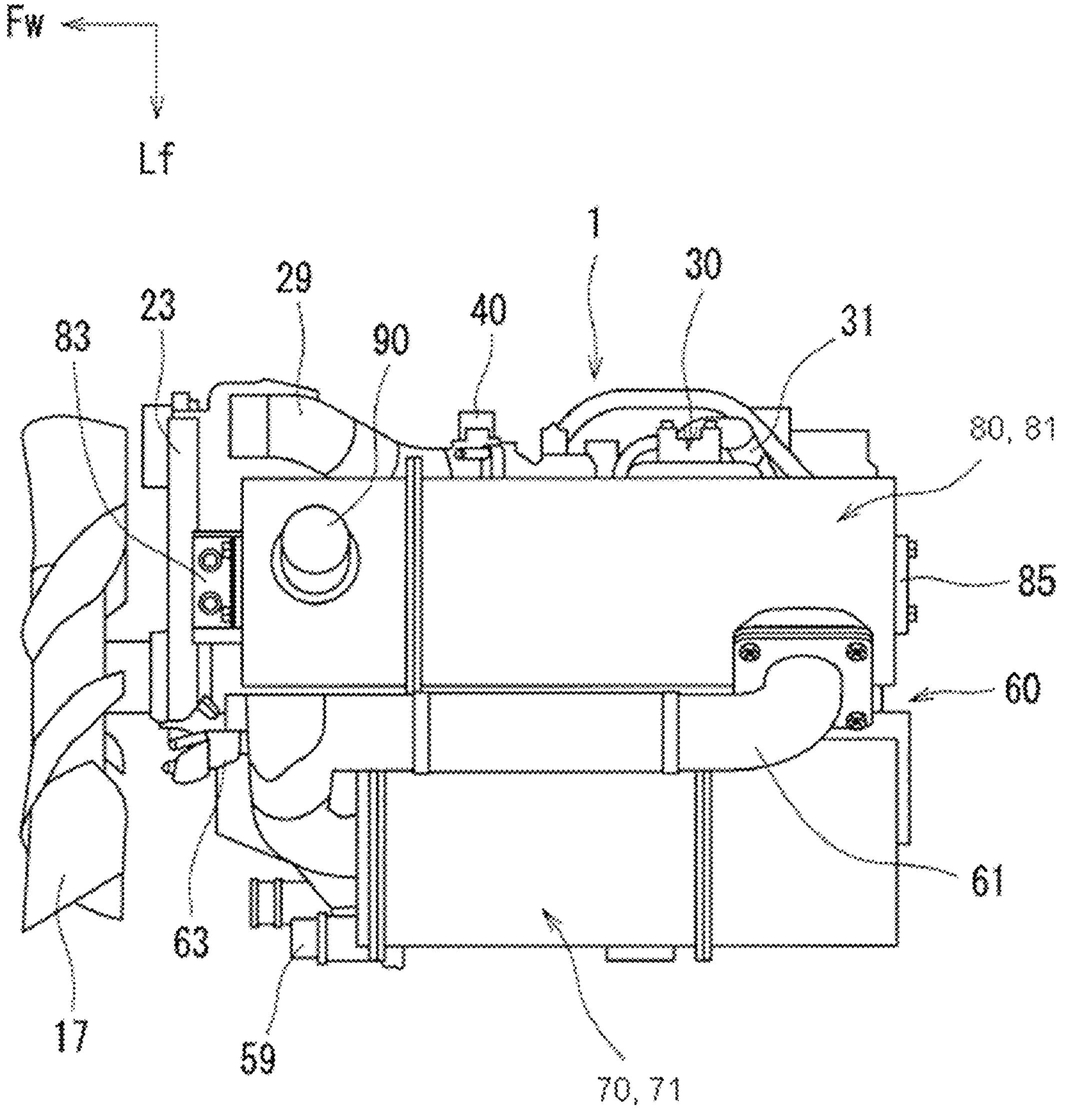
FIG. 2 is a plan view which schematically illustrates the diesel engine.
Figure 3:
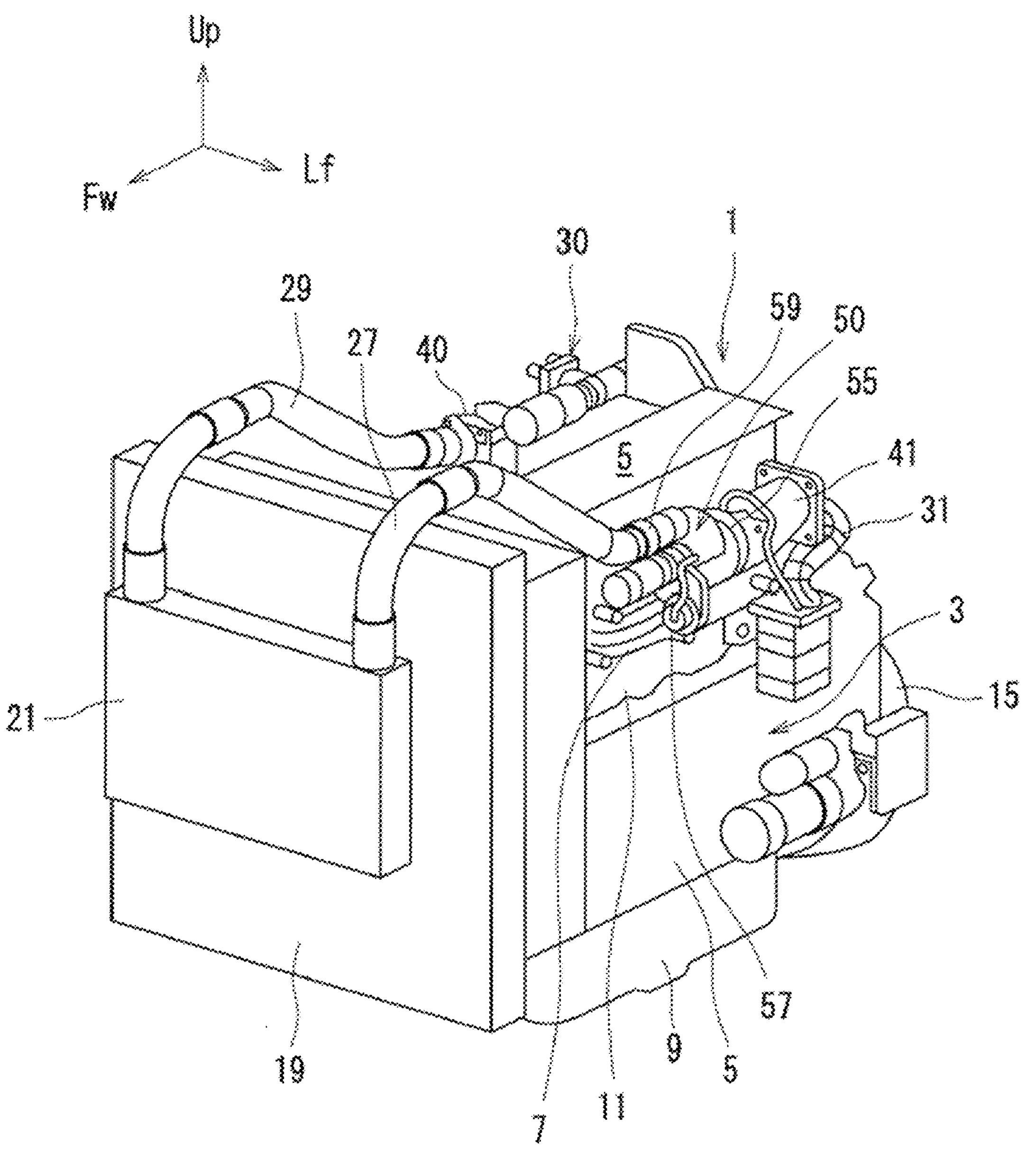
FIG. 3 is a perspective view which schematically illustrates the diesel engine.

FIGS. 1, 2, and 3 are, respectively, a side view, a plan view, and a perspective view, which schematically illustrate a diesel engine 1 according to the present embodiment. To simplify the illustration of the drawings, a radiator 19 and an intercooler 21 are omitted from illustration in FIG. 2, and an exhaust gas after-treatment device 60 is omitted from illustration in FIG. 3.

As illustrated in FIGS. 1 to 3, the diesel engine 1 is provided with a cylinder block 5, a cylinder head 7, an oil pan 9, an exhaust manifold 11, an intake manifold (not illustrated), a flywheel 13, a cooling fan 17, the radiator 19, the intercooler 21, an EGR device 30, an intake throttle device 40, a turbocharger 50, and an exhaust gas after-treatment device 60 which purifies exhaust gas.

The cylinder block 5 includes first to fourth cylinders (not illustrated) in order, from the rear side (the side corresponding to the flywheel 13) in the engine front-rear direction. In addition, four pistons (not illustrated), which reciprocate up and down inside the respective cylinders, and a crankshaft (crank shaft) 10 coupled to the four pistons via a connecting rod (not illustrated) are incorporated within the cylinder block 5. The oil pan 9, which is for storing oil that is circulated in the diesel engine 1 to lubricate each part, is fixed to the lower part of the cylinder block 5. Meanwhile, the cylinder head 7 is fastened to the upper part of the cylinder block 5, as illustrated in FIG. 1. Thus, in the diesel engine 1, four combustion chambers (not illustrated), which are delimited by the four cylinders of the cylinder block 5, the cylinder head 7, and top faces of the four pistons that reciprocate up and down inside the cylinders, are formed.

In the following, a combination of the cylinder block 5 and the cylinder head 7 which is fastened to the upper part of the cylinder block 5 may also be hereinafter referred to as an engine body part 3.

In the cylinder head 7, from a ceiling portion of each of the combustion chambers, an intake port (not illustrated), which extends diagonally upward toward the right side in the engine width direction, and an exhaust port (not illustrated), which extends diagonally upward toward the left side in the engine width direction, are formed. Further, while an intake manifold is connected to the cylinder head 7 on the right side in the engine width direction, the exhaust manifold 11 is connected on the left side in the engine width direction. Thus, intake air which has flowed inside the intake manifold is introduced into each of the combustion chambers through the intake port (intake stroke). In each of the combustion chambers, fuel is injected into air which has been heated by compression by the piston, thereby causing an air-fuel mixture containing the intake air and the fuel to self-ignite and be combusted (compression stroke and expansion stroke). Further, exhaust gas produced in each of the combustion chambers by the combustion of the air-fuel mixture is discharged to the exhaust manifold 11 through the exhaust port (exhaust stroke). As can be seen, the cylinder head 7 of the present embodiment is configured such that the left side (one side) in the engine width direction corresponds to the exhaust side, and the right side (the other side) in the engine width direction corresponds to the intake side.

As described above, in the diesel engine 1, as a cycle of the intake stroke, the compression stroke, the expansion stroke, and the exhaust stroke is repeated, each of the four pistons reciprocates up and down, and such an up-and-down reciprocating motion of the piston is converted into a rotation of the crankshaft 10 by means of the connecting rod.

At the rear side (the other side) in the engine front-rear direction of the engine body part 3, a flywheel housing 15 which accommodates the flywheel 13 is provided, as illustrated in FIG. 1. The flywheel 13 accommodated within the flywheel housing 15 is coupled to a rear end portion of the crankshaft 10, and is configured to rotate together with the crankshaft 10 integrally. In this way, by the rotation of the flywheel 13, rotational energy is accumulated at the time of starting and the starting is facilitated, and also, the rotation of the crankshaft 10 is stabilized after the starting. In addition, by retrieving power from the flywheel 13, it is possible to operate a threshing machine or a hydraulic excavator, for example, provided on a work vehicle (not illustrated) in which the diesel engine 1 is mounted.

Meanwhile, at the front side (one side) in the engine front-rear direction of the engine body part 3, as illustrated in FIGS. 1 and 3, the radiator 19 which cools the diesel engine 1, the intercooler 21 which cools air (compressed air) compressed by the turbocharger 50, and the cooling fan 17 which blows air to the radiator 19 and the intercooler 21 are provided. More specifically, the radiator 19 is arranged in front of the cooling fan 17, and the intercooler 21 is arranged further toward the front of the radiator 19.

The cooling fan 17 is rotated as a result of rotative power being transmitted from a pulley 10*a* that is attached to a front end portion of the crankshaft 10 via a V-ribbed belt 23. By the rotation of the cooling fan 17, air is sucked from an outside air inlet provided at an engine cover (not illustrated), and the intercooler 21 and the radiator 19 are cooled by the sucked air. At this time, a cooling water pump 25 is also driven together with the cooling fan 17, and cooling water in the radiator 19 is supplied to the cooling water pump 25. The cooling water supplied to the cooling water pump 25 in this way is supplied to a water-cooling jacket (not illustrated) formed in the cylinder block 5 and the cylinder head 7 by the driving of the cooling water pump 25, and the diesel engine 1 is thereby cooled.

As illustrated in FIGS. 1 and 3, while the intercooler 21 is connected to an intake ejection pipe 59 of the turbocharger 50 to be described later via an upstream-side intake pipe 27, the intercooler 21 is connected to the intake throttle device 40 provided on the intake side of the cylinder head 7 via a downstream-side intake pipe 29. The compressed air from the turbocharger 50 is thereby once cooled in the intercooler 21 before being supplied to each of the cylinders via the intake throttle device 40 and the intake manifold. Consequently, intake charging efficiency can be enhanced.

In addition, in the present embodiment, part of exhaust gas discharged from each of the combustion chambers to the exhaust manifold 11 through the exhaust port is returned (recirculated) to the intake side. Specifically, as illustrated in FIGS. 2 and 3, the EGR device 30 is provided on the intake side of the cylinder head 7. As illustrated in FIGS. 1 and 3, the EGR device 30 is provided with an EGR pipe 31 as an EGR passage connecting the intake side and the exhaust side, and returns part of the exhaust gas to the intake side through the EGR pipe 31.

An EGR valve which is composed of an electromagnetic flow control valve, for example, is provided inside the EGR pipe 31, and the amount of exhaust gas (EGR volume) returned from the exhaust side to the intake side is adjusted by adjusting (changing) an opening degree of the EGR valve as necessary. In this way, in the diesel engine 1 of the present embodiment, part of the exhaust gas is mixed with the intake air. Thus, it is possible to lower the combustion temperature and reduce nitrogen oxides (NOx) in the exhaust gas.

As illustrated in FIGS. 1 and 3, the turbocharger 50 is provided on the exhaust side of the cylinder head 7. The turbocharger 50 includes a turbine housing 51 in which a turbine wheel (not illustrated) is incorporated, and a compressor housing 53 in which a compressor wheel (not illustrated) is incorporated. The turbine wheel and the compressor wheel are configured to rotate integrally by means of a connecting shaft (not illustrated).

In the turbine housing 51, an upstream side of the turbine wheel communicates with the exhaust manifold 11. In addition, an exhaust pipe 41 is connected to an exhaust outlet 55 provided on a downstream side of the turbine wheel in the turbine housing 51. The exhaust outlet 55 of the turbocharger 50 and an exhaust introduction port 73 of the exhaust gas after-treatment device 60 are connected to each other via the exhaust pipe 41. With such a configuration, exhaust gas discharged from each of the combustion chambers to the exhaust manifold 11 through the exhaust port is introduced to the turbine housing 51, and after flowing toward the downstream side while rotating the turbine wheel, the exhaust gas is discharged from the exhaust outlet 55, and then introduced to the exhaust gas after-treatment device 60 via the exhaust pipe 41.

In contrast, in the compressor housing 53, while an intake introduction pipe 57 extending in the front side in the engine front-rear direction is provided on an upstream side of the compressor wheel, the intake ejection pipe 59 extending in the front side in the engine front-rear direction is provided on a downstream side of the compressor wheel. The intake introduction pipe 57 communicates with an air cleaner (not illustrated). Also, the upstream-side intake pipe 27 is connected to the intake ejection pipe 59, and the intake ejection pipe 59 of the turbocharger 50 and the intercooler 21 are connected to each other via the upstream-side intake pipe 27. With such a configuration, fresh air obtained by removing dust by the air cleaner is introduced to the compressor housing 53, and is compressed by the compressor wheel that is rotationally driven in accordance with the rotation of the turbine wheel. After that, the fresh air is ejected from the intake ejection pipe 59 toward the front side in the engine front-rear direction, and is cooled by the intercooler 21. After that, the fresh air is sent to the intake manifold via the intake throttle device 40, is mixed with the returned exhaust gas in the intake manifold, and is then supplied to each of the cylinders.

The exhaust gas after-treatment device (which may hereinafter also be referred to as After Treatment Device ("ATD")) 60 is provided with a DPF 70, an SCR 80, an SCR pipe 61 connecting the DPF 70 and the SCR 80, and a dosing module (a urea injection device) 63 provided close to upstream of the SCR pipe 61.

The DPF 70 is structured such that an oxidation catalyst (not illustrated) and a soot filter (not illustrated) are arranged in series, and are accommodated in a DPF casing 71. In the DPF 70, when exhaust gas which has flowed into the DPF casing 71 from the exhaust introduction port 73 passes through the soot filter, particulate matter in the exhaust gas is collected by the soot filter. Further, when the exhaust gas passes through the oxidation catalyst, if the exhaust gas temperature is above a regenerable temperature, the particulate matter that has been deposited on the soot filter is removed by combustion by oxygen whose temperature has become high due to the action of the oxidation catalyst, and the soot filter is regenerated.

The SCR 80 is structured such that an SCR catalyst for urea selective catalytic reduction (not illustrated) and an oxidation catalyst (not illustrated) are arranged in series, and are accommodated in an SCR casing 81. An upstream end portion of the SCR casing 81 is connected to a downstream end portion of the DPF casing 71 via the SCR pipe 61 that is relatively long. In the SCR pipe 61, as urea water is injected from the dosing module 63 to the exhaust gas that has flowed from the DPF 70, ammonia gas is generated. Mixing of the exhaust gas and the ammonia gas is promoted while the exhaust gas passes through the relatively long SCR pipe 61. In the SCR 80, when the exhaust gas and the ammonia gas that have flowed into the SCR casing 81 pass through the SCR catalyst, the nitrogen oxides in the exhaust gas chemically react with ammonia, and are reduced to nitrogen and water. In addition, the ammonia is reduced when passing through the oxidation catalyst.

As described above, the exhaust gas from which the particulate matter has been removed by the DPF 70 and the nitrogen oxides have been reduced by the SCR 80 is discharged from a tail pipe 90 provided at a downstream end portion of the SCR casing 81.

Layout of Turbocharger and ATD

Next, a layout of the turbocharger 50 and the ATD 60 in the diesel engine 1 will be described. Prior to this, in order to facilitate the understanding of the present invention, a layout of a turbocharger and an ATD in a conventional diesel engine will be described.

Figure 7A:
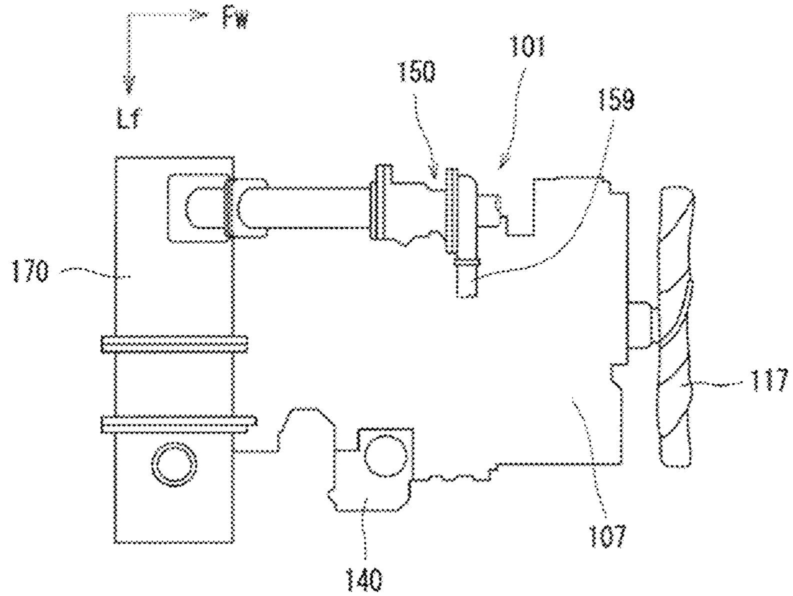
FIG. 7(*a*) and FIG. 7(*b*) are drawings which schematically illustrate a conventional diesel engine, and FIG. 7(*a*) is a plan view thereof and FIG. 7(*b*) is a cross-sectional view thereof.
Figure 7B:
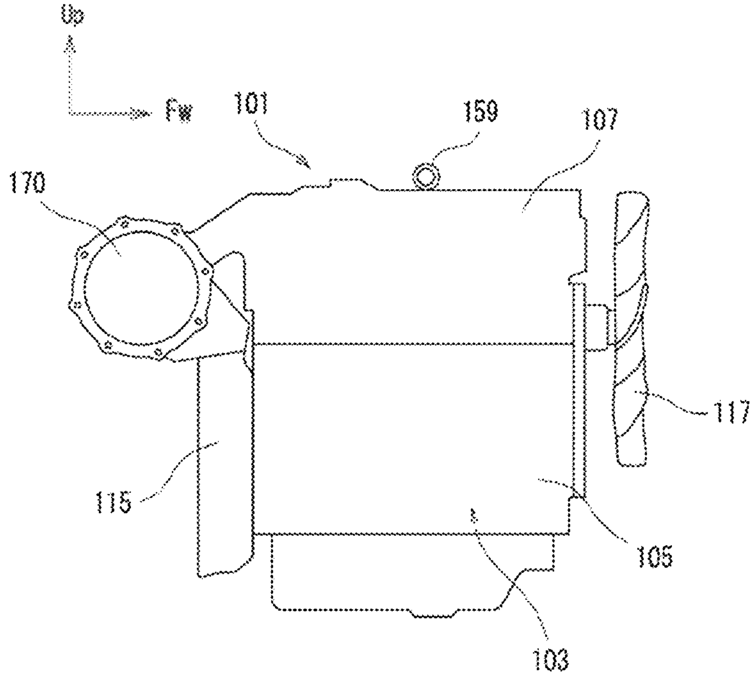

FIG. 7(*a*) and FIG. 7(*b*) are drawings which schematically illustrate a conventional diesel engine 101, and FIG. 7(*a*) is a plan view and FIG. 7(*b*) is a cross-sectional view. As illustrated in views FIG. 7(*a*) and FIG. 7(*b*), the conventional diesel engine 101 is also provided with: a cooling fan 117 on the front side in an engine front-rear direction of an engine body part 103 in which a cylinder head 107 is fastened to the upper part of a cylinder block 105; and a flywheel housing 115 on the rear side in the engine front-rear direction, as in the diesel engine 1 of the present embodiment. Further, the cylinder head 107 is configured such that the left side in an engine width direction corresponds to the exhaust side, and the right side in the engine width direction corresponds to the intake side, and this point is also similar to the diesel engine 1 of the present embodiment.

Naturally, however, the conventional diesel engine 101 is different from the diesel engine 1 of the present embodiment in that a DPF 170, as an exhaust gas after-treatment device, is arranged to extend in the engine width direction above the flywheel housing 115 at an end portion on the rear side in the engine front-rear direction. Moreover, an intake ejection pipe 159 of a turbocharger 150, which is for supplying compressed air to an intake throttle device 140, extends in the engine width direction above the cylinder head 107 so as to traverse the cylinder head 107. This point is also different from the diesel engine 1 of the present embodiment.

Incidentally, in engines such as a diesel engine, for instance, the length in the engine front-rear direction is generally greater than the length in the engine width direction. Further, ATDs such as a DPF and an SCR tend to be relatively (as compared to the engine width direction) long.

Despite the above, if the DPF 170 is arranged to extend in the engine width direction as in the conventional diesel engine 101, an engine overall width is determined by the length of the DPF 170 as illustrated in FIG. 7(*a*). Thus, there arises a problem in which it is difficult to make the engine as a whole compact. Moreover, as illustrated in FIG. 7(*b*), since the DPF 170 protrudes toward the rear side in the engine front-rear direction relative to the flywheel housing 115, there also arises a problem in which the engine overall length is relatively increased.

Here, in the conventional diesel engine 101, the DPF 170 that is relatively long may be arranged to extend in the engine front-rear direction. However, if the DPF 170 and the cylinder head 107 are arranged side by side in the engine width direction, for example, there arises a problem in which the engine overall width is increased. Further, for example, if the DPF 170 is arranged above the cylinder head 107, it is possible to prevent the engine overall width from increasing. However, the DPF 170 may interfere with the intake ejection pipe 159 that traverses the cylinder head 107.

Hence, in the diesel engine 1 according to the present embodiment, the ATD 60 is arranged above the cylinder head 7, and compressed air from the turbocharger 50 is ejected toward the intercooler 21 in the engine front-rear direction.

Specifically, in the diesel engine 1 according to the present embodiment, the ATD 60 including the DPF 70 and the SCR 80 is arranged above the cylinder head 7 so as to extend in the engine front-rear direction, and the turbocharger 50 is configured to eject compressed air toward the side corresponding to the cooling fan 17 in the engine front-rear direction.

More specifically, as illustrated in FIG. 2, the DPF 70 is located on the left side in the engine width direction above the cylinder head 7 in such a posture as to extend in the engine front-rear direction, and is fixed to the cylinder head 7 with a bracket 75, etc., such that a rear end of the DPF 70 in the engine front-rear direction is substantially flush with a rear end of the flywheel housing 15. Meanwhile, the SCR 80 is located on the right side in the engine width direction above the cylinder head 7 in such a posture as to extend in the engine front-rear direction, and is fixed to the cylinder head 7 with brackets 83, 85, etc., such that a rear end of the SCR 80 in the engine front-rear direction is substantially flush with the rear end of the flywheel housing 15. The DPF 70 and the SCR 80 communicate with each other by the SCR pipe 61, which is connected to a front end (a downstream end) of the DPF casing 71, is slightly extended to the front side in the engine front-rear direction, is then bent by 180 degrees to be extended to the rear side in the engine front-rear direction, and is then bent to the right side in the engine width direction to be connected to a rear end portion (the upstream end portion) of the SCR casing 81.

Thus, in the diesel engine 1 of the present embodiment, the ATD 60 that is relatively long is arranged above the cylinder head 7 so as to extend in the engine front-rear direction, in other words, the ATD 60 is arranged such that, as seen in plan view, the ATD 60 overlaps the cylinder head 7 that is relatively long in the engine front-rear direction. Consequently, as compared to cases where the ATD 60 is arranged to extend in the engine width direction or the ATD 60 and the cylinder head 7 are arranged side by side in the engine width direction, the engine as a whole can be made more compact.

Meanwhile, the turbocharger 50 is arranged close to the cooling fan 17 in the engine front-rear direction on the exhaust side of the cylinder head 7. Further, as described above, the intake ejection pipe 59 that ejects compressed air extends in the front side in the engine front-rear direction. More specifically, the exhaust outlet 55 of the turbocharger 50 is arranged at a central portion in the engine front-rear direction, in other words, at a position corresponding to between the second cylinder and the third cylinder (refer to the position of the crankshaft 10 in FIG. 1). Further, the turbocharger 50 is arranged more to the front side (the side corresponding to the cooling fan 17) than the central portion in the engine front-rear direction.

In addition, the exhaust introduction port 73 of the DPF 70 is provided above the flywheel housing 15, as illustrated in FIG. 1. Further, the exhaust introduction port 73 of the DPF 70 and the exhaust outlet 55 of the turbocharger 50 that is located at the central portion in the engine front-rear direction are connected by the exhaust pipe 41, which extends in the engine front-rear direction, provided on the exhaust side of the cylinder head 7.

Thus, the diesel engine 1 of the present embodiment is different from the conventional turbocharger 150 in which compressed air is ejected (the intake ejection pipe 159 is extended) to traverse the cylinder head 107 in the engine width direction. In other words, in the diesel engine 1 of the present embodiment, the turbocharger 50 arranged on the exhaust side of the cylinder head 7 is configured to eject compressed air toward the side corresponding to the cooling fan 17 in the engine front-rear direction. Accordingly, as illustrated in FIG. 3, it is possible to secure a relatively large space S above the cylinder head 7, and thus the ATD 60 can be arranged to extend in the engine front-rear direction. Consequently, even if the ATD 60 is arranged to extend in engine front-rear direction above the cylinder head 7, it is possible to prevent the ATD 60 and the turbocharger 50 from interfering with each other.

Moreover, the turbocharger 50 is arranged close to the cooling fan 17 in the engine front-rear direction, and compressed air is ejected toward the side corresponding to the cooling fan 17 (the side corresponding to the intercooler 21) in the engine front-rear direction. Thus, it is possible to efficiently cool the compressed air via the upstream-side intake pipe 27 that is relatively short.

Also, the exhaust outlet 55 of the turbocharger 50 is located at the central portion in the engine front-rear direction. Thus, regardless of whether the exhaust introduction port 73 is provided on the front side (the side corresponding to the cooling fan 17) in the engine front-rear direction of the ATD 60, or whether the exhaust introduction port 73 is provided on the rear side (the side opposite to the cooling fan 17), it is possible to prevent the exhaust pipe 41 connecting the exhaust outlet 55 and the exhaust introduction port 73 from being extremely long. By virtue of this feature, handling of the exhaust pipe 41 can be easily performed without changing the layout of the turbocharger 50, in other words, by keeping the turbocharger 50 arranged close to the cooling fan 17.

Furthermore, since the exhaust introduction port 73 of the ATD 60 is provided above the flywheel housing 15, a space above the flywheel housing 15 can be effectively utilized to further make the engine as a whole including the flywheel housing 15 more compact.

Embodiment 2

The present embodiment is different from the above Embodiment 1 in the arrangement of an ATD 60' above a cylinder head 7, the position of an exhaust introduction port 73' in the ATD 60', and the shape of an exhaust pipe 41' connecting the exhaust introduction port 73' and an exhaust outlet 55 of a turbocharger 50. The points different from Embodiment 1 will be focused in the description given below.

Figure 4:
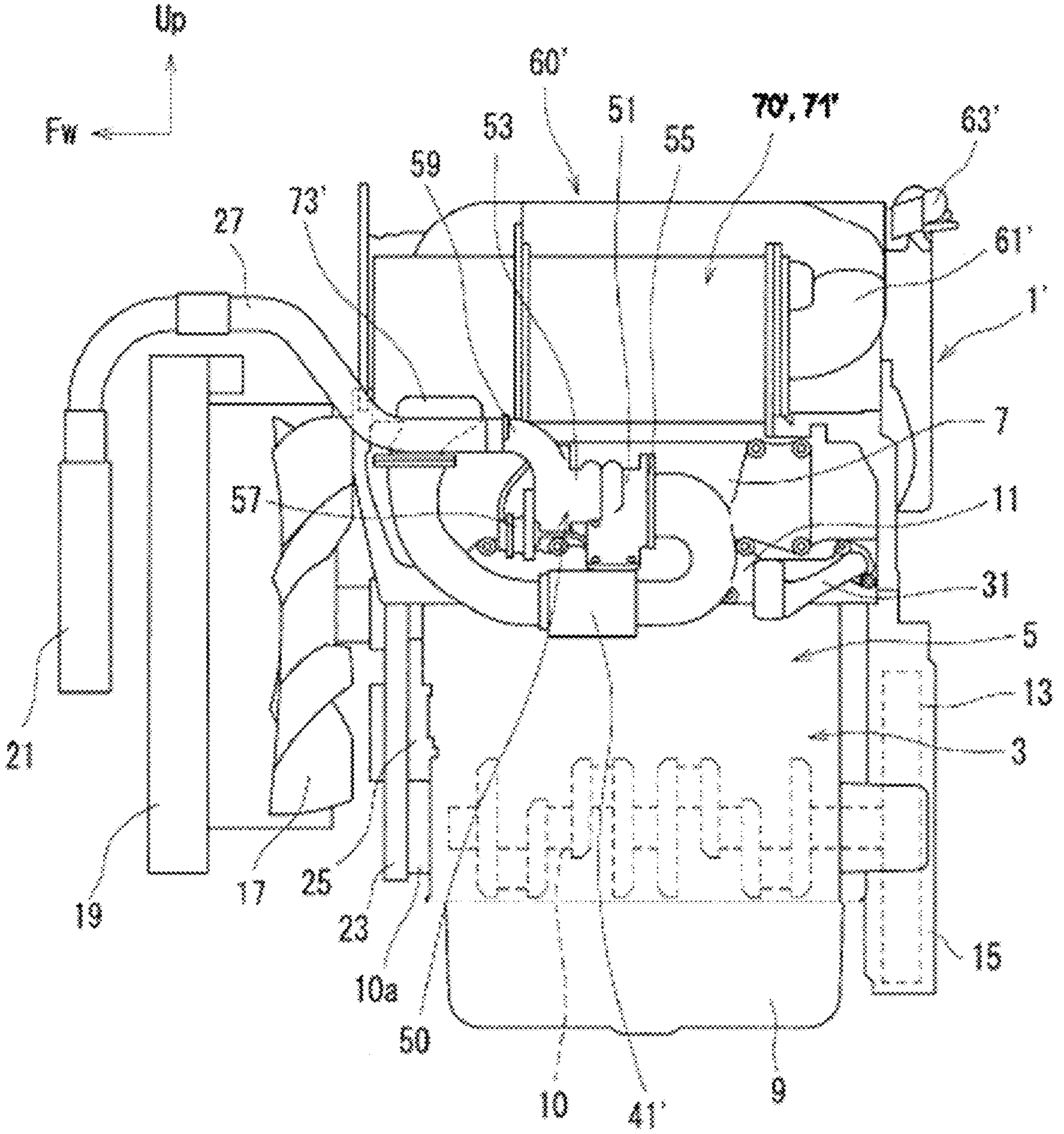
FIG. 4 is a side view which schematically illustrates a diesel engine according to Embodiment 2 of the present invention.
Figure 5:
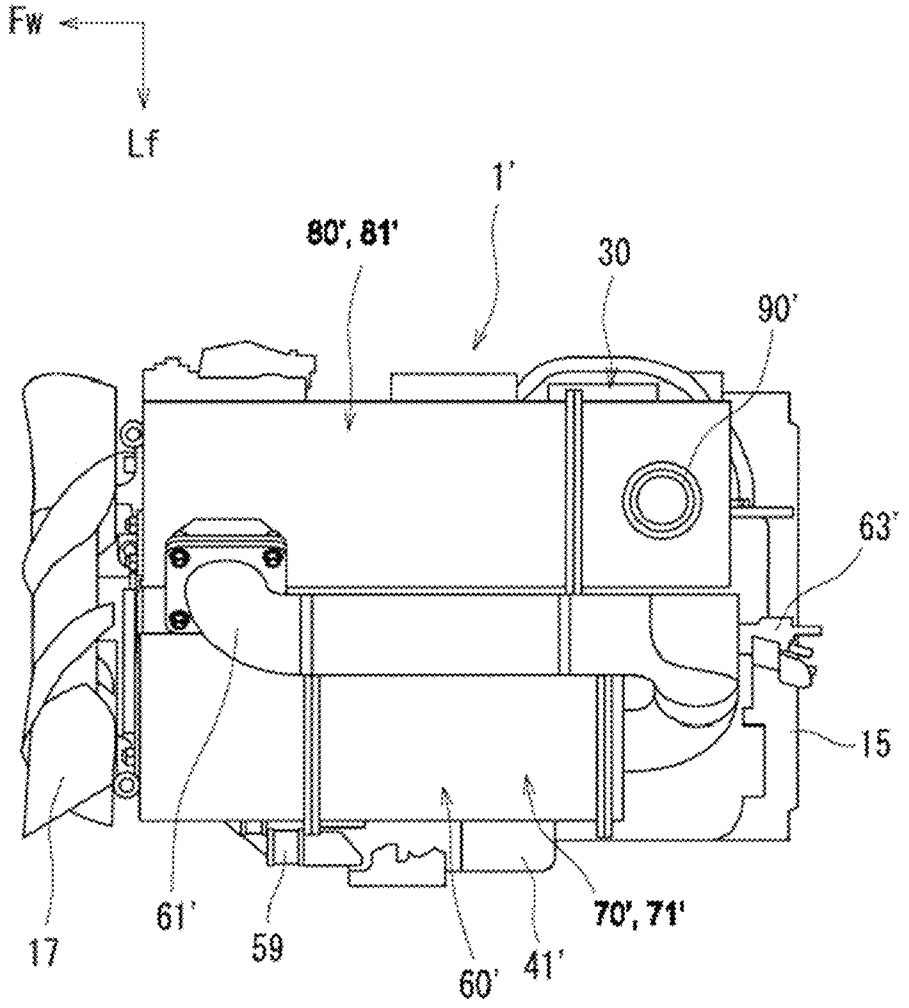
FIG. 5 is a plan view which schematically illustrates the diesel engine.
Figure 6:
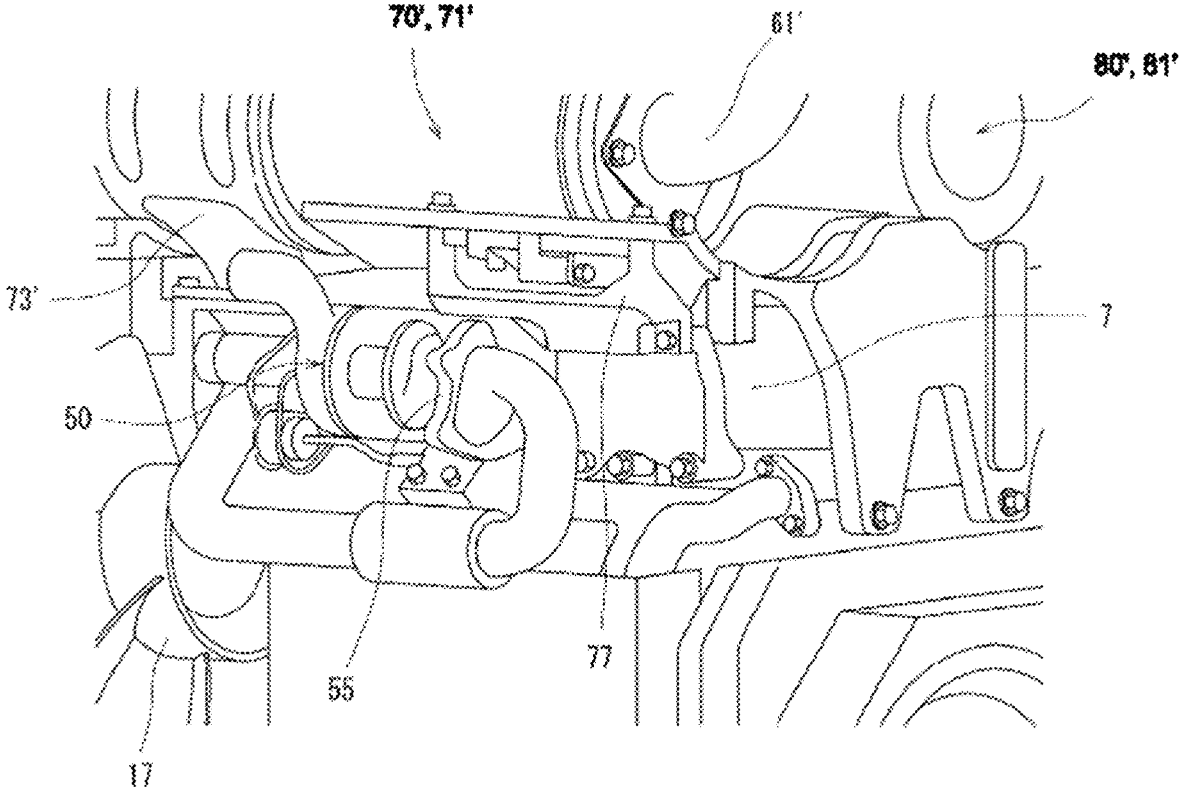
FIG. 6 is a perspective view which schematically illustrates the diesel engine.

FIGS. 4, 5, and 6 are, respectively, a side view, a plan view, and a perspective view, which schematically illustrate a diesel engine 1' according to the present embodiment. To simplify the illustration of the drawing, a radiator 19 and an intercooler 21 are omitted from illustration in FIG. 5.

The ATD 60' is provided with: a DPF 70'; an SCR 80'; an SCR pipe 61' connecting the DPF 70' and the SCR 80'; and a dosing module 63' provided in the SCR pipe 61'. The DPF 70', the SCR 80', the SCR pipe 61', and the dosing module 63' have similar configurations as those of the DPF 70, the SCR 80, the SCR pipe 61, and the dosing module 63 in the above Embodiment 1 except for the arrangement and the like. Therefore, descriptions of the individual configurations are omitted.

As illustrated in FIGS. 4 and 5, the DPF 70' is located on the left side in an engine width direction above the cylinder head 7 in such a posture as to extend in an engine front-rear direction, and is fixed to the cylinder head 7 with a bracket 77, etc., indicated in FIG. 6, such that a front end of the DPF 70' in the engine front-rear direction is located between a cooling fan 17 and an engine body part 3. Meanwhile, the SCR 80' is located on the right side in the engine width direction above the cylinder head 7 in such a posture as to extend in the engine front-rear direction, and is fixed to the cylinder head 7 such that a front end of the SCR 80' in the engine front-rear direction is located between the cooling fan 17 and the engine body part 3. The DPF70' and the SCR 80' communicate with each other by the SCR pipe 61' which is connected to a rear end (a downstream end) of a DPF casing 71', is slightly extended to the rear side in the engine front-rear direction, is then bent by 180 degrees to be extended to the front side in the engine front-rear direction, and is then bent to the right side in the engine width direction to be connected to a front end portion (an upstream end portion) of a SCR casing 81'. Unlike the above Embodiment 1, in the present embodiment, a tail pipe 90' is provided at a rear end portion of the SCR casing 81'.

In addition, the exhaust introduction port 73' of the DPF 70' is provided between the cooling fan 17 and the turbocharger 50 in the engine front-rear direction, as illustrated in FIG. 4. Further, the exhaust introduction port 73' of the DPF 70' and the exhaust outlet 55 of the turbocharger 50 that is located at a central portion in the engine front-rear direction are connected by the exhaust pipe 41' provided on the exhaust side of the cylinder head 7. As illustrated in FIG. 4, the exhaust pipe 41' is slightly extended to the rear side in the engine front-rear direction and is then bent by 180 degrees, and after being extended to the front side in the engine front-rear direction below the turbocharger 50, is bent upward and is connected to the exhaust introduction port 73' of the DPF 70' which is provided between the cooling fan 17 and the turbocharger 50, while passing through the inside of an upstream-side intake pipe 27 in the engine width direction.

Thus, in the diesel engine 1' of the present embodiment, the ATD 60' that is relatively long is arranged above the cylinder head 7 so as to extend in the engine front-rear direction. Consequently, as in the above Embodiment 1, the engine as a whole can be made compact.

Also, the exhaust outlet 55 of the turbocharger 50 is located at the central portion in the engine front-rear direction. Thus, even though the exhaust introduction port 73' is provided on the front side (the side corresponding to the cooling fan 17) in the engine front-rear direction of the ATD 60', it is possible to prevent the exhaust pipe 41' connecting the exhaust outlet 55 and the exhaust introduction port 73' from being extremely long. By virtue of this feature, handling of the exhaust pipe 41' can be easily performed without changing the layout of the turbocharger 50.

In addition, the exhaust gas after-treatment device 60' can be placed in proximity to the cooling fan 17 by providing the exhaust introduction port 73' of an exhaust gas after-treatment device 60' between the cooling fan 17 and the turbocharger 50 that is arranged close to the cooling fan 17. Consequently, as can be understood by comparing FIG. 1 with FIG. 4, the engine as a whole can be made compact in the engine front-rear direction.

Other Embodiments

The present invention is not limited to these embodiments, and can be implemented in various other forms without departing from the spirit or main features of the present invention.

In each of the above embodiments, the side corresponding to the cooling fan 17 in the diesel engine 1, 1' is described as the front side in the engine front-rear direction, and the side corresponding to the flywheel 13 is described as the rear side in the engine front-rear direction. However, the front-rear direction of the diesel engine 1, 1' and the front-rear direction of a work vehicle in which the diesel engine 1, 1' is mounted need not necessarily conform to each other. For example, the diesel engine 1, 1' may be mounted in a work vehicle in such a way that the front-rear direction of the diesel engine 1, 1' conforms to the front-rear direction of the work vehicle. Alternatively, the diesel engine 1, 1' may be mounted in a work vehicle in such a way that the front-rear direction of the diesel engine 1, 1' conforms to a width direction of a device body of the work vehicle.

Further, in each of the above embodiments, the cylinder head 7 is configured such that the left side in the engine width direction corresponds to the exhaust side, and the right side in the engine width direction corresponds to the intake side. However, the configuration is not limited to the above and the cylinder head 7 may be configured such that the right side in the engine width direction corresponds to the exhaust side, and the left side in the engine width direction corresponds to the intake side.

Furthermore, in each of the above embodiments, the intercooler 21 is provided on the front side in the engine front-rear direction of the engine body part 3. However, as long as compressed air can be ejected in the engine front-rear direction, the configuration is not limited to the above. That is, for example, the turbocharger 50 may be configured as an intercooler-less turbocharger by omitting the intercooler 21. Also in this case, since the turbocharger 50 is configured to eject compressed air in the engine front-rear direction, even if the ATD 60, 60' is arranged to extend in the engine front-rear direction above the cylinder head 7, it is possible to prevent the ATD 60, 60' and the turbocharger 50 from interfering with each other.

Accordingly, the embodiments described above are merely examples in all respects, and should not be restrictively interpreted. Furthermore, modifications and changes deemed to be the equivalents of the claims all fall within the scope of the present invention.

The present application claims the benefit of priority to Japanese Patent Application No. 2020-165318, filed Sep. 30, 2020, with the JPO. The entire contents of which are incorporated herein by reference.

Industrial Applicability

According to the present invention, an engine as a whole can be made compact even if the engine is provided with a turbocharger and an exhaust gas after-treatment device. Therefore, it is extremely beneficial when the present invention is applied to a diesel engine which is provided with a turbocharger and an exhaust gas after-treatment device.

DESCRIPTION OF REFERENCE NUMERALS

- 1 Diesel engine
- 1' Diesel engine
- 3 Engine body part
- 5 Cylinder block
- 7 Cylinder head
- 10 Crankshaft (crank shaft)
- 13 Flywheel
- 15 Flywheel housing
- 17 Cooling fan
- 21 Intercooler
- 41 Exhaust pipe
- 41' Exhaust pipe
- 50 Turbocharger
- 55 Exhaust outlet
- 60 Exhaust gas after-treatment device
- 60' Exhaust gas after-treatment device
- 73 Exhaust introduction port
- 73' Exhaust introduction port

The invention claimed is:

1. A diesel engine comprising:

a turbocharger which compresses intake air by utilizing a flow of exhaust gas; and an exhaust gas after-treatment device which purifies the exhaust gas, wherein an exhaust pipe connects the exhaust gas after treatment device and the turbocharger, and the exhaust pipe is connected upwardly to the exhaust gas after-treatment device at a front side in a front to rear direction of the diesel engine by extending below the turbocharger.

2. The diesel engine according to claim 1, wherein the exhaust pipe has a bent portion located at a rear side in the front to rear direction of the diesel engine, the bent portion being bent and connected to the turbo charger.

3. The diesel engine according to claim 2, wherein the bent portion has one end that is connected to the turbo charger, and another end which is opposite from the one end, and the one end and the another end face towards a front direction of the diesel engine.

4. The diesel engine according to claim 2, wherein the bent portion is bent by 180 degrees.

5. The diesel engine according to claim 2, wherein the exhaust pipe is extended to a rear side in the front to rear direction of the diesel engine, then bent by 180 degrees, and after being extended to a front side in the engine front-rear direction below the turbocharger, is bent upward and is connected to the exhaust gas after-treatment device.

6. The diesel engine according to claim 1, wherein the turbocharger has an intake ejection pipe which ejects the gas and faces towards the front direction.

7. The diesel engine according to claim 1, wherein the turbocharger has an exhaust outlet which exhausts the exhaust gas and which is arranged at a central portion in the front to rear direction of the diesel engine.

8. The diesel engine according to claim 7, wherein the turbocharger is placed closer to the front side than the central portion.

9. The diesel engine according to claim 1, wherein the turbocharger is located above and within a length of the exhaust pipe.

10. The diesel engine according to claim 1, wherein the exhaust gas after treatment device is extended in a front-rear direction, and a part of the exhaust pipe is extended in the front to rear direction of the diesel engine.

* * * * *